Patented Feb. 3, 1948

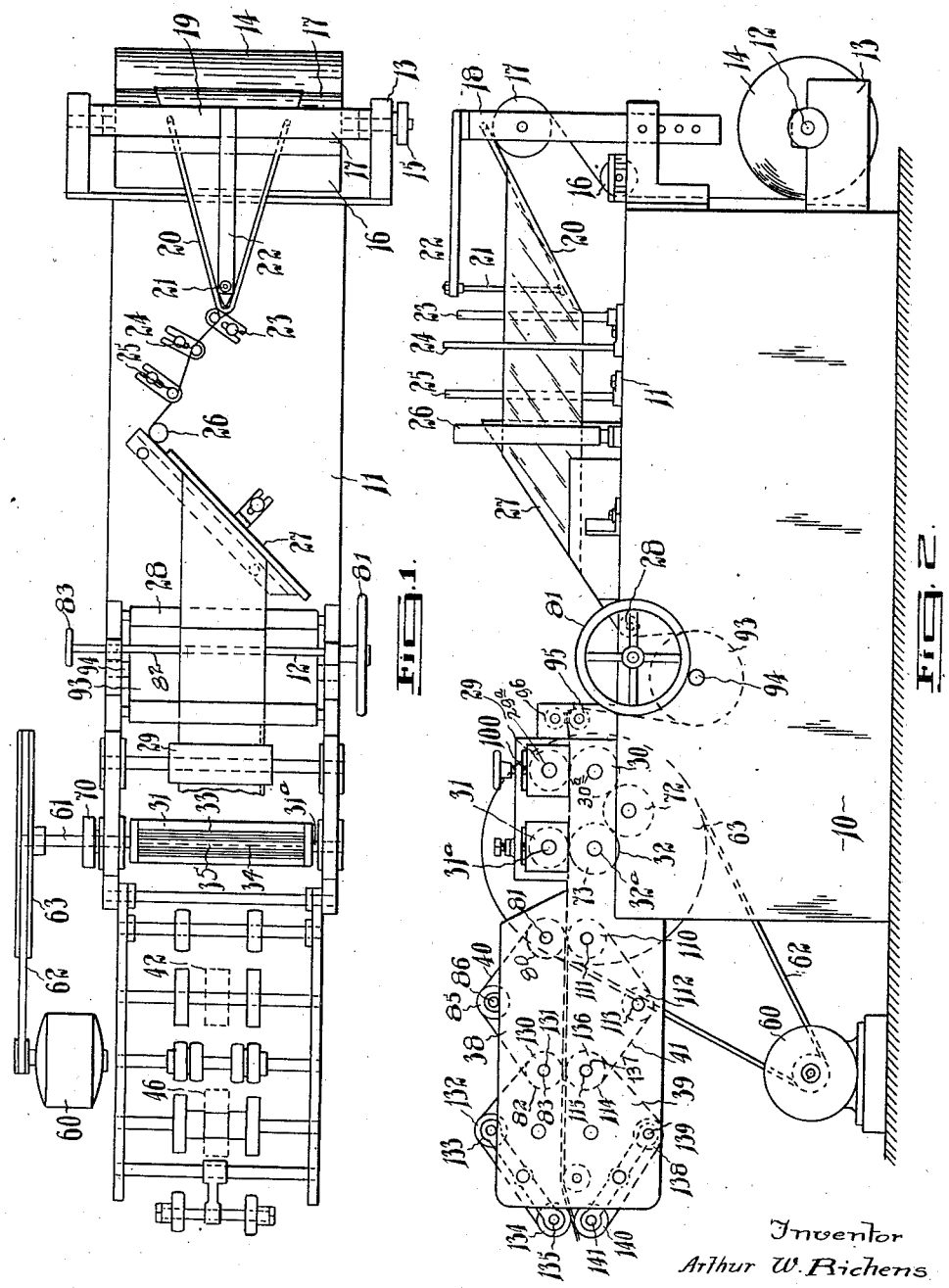

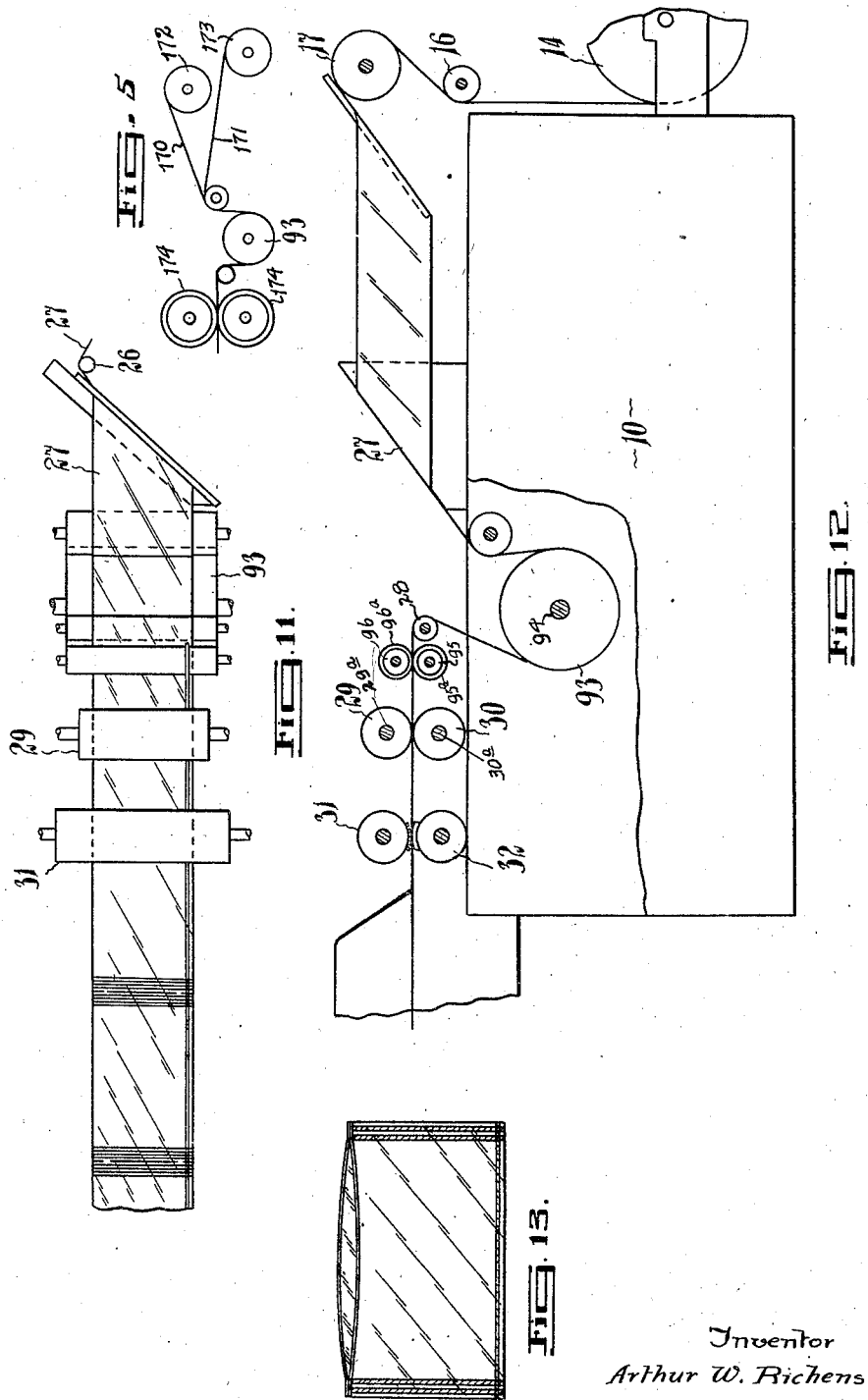

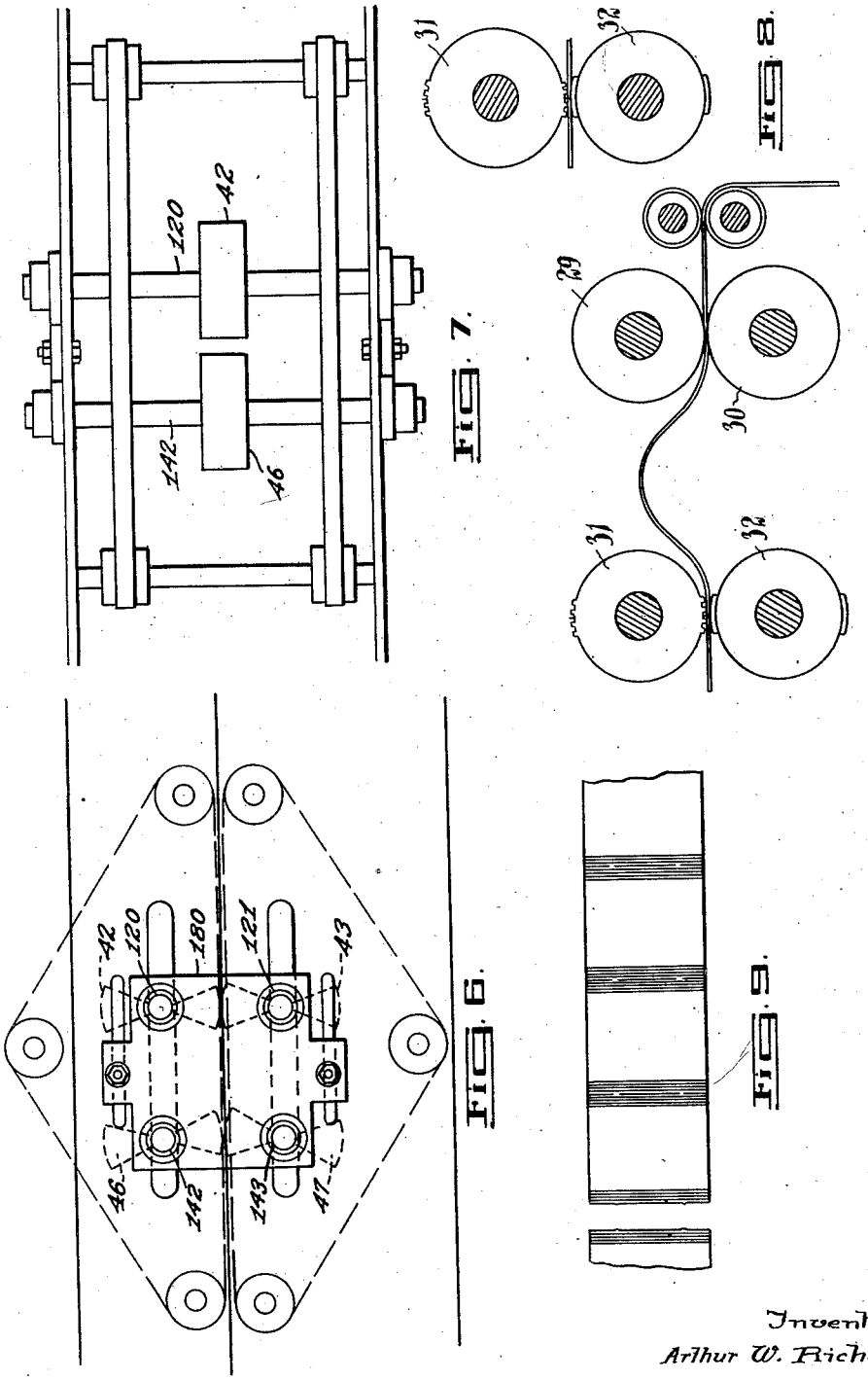

2,435,560

UNITED STATES PATENT OFFICE 2,435,560

BAG MAKING MACHINE AND METHOD

Arthur W. Richens, Toronto, Ontario, Canada, assignor to E. S. & A. Robinson (Canada) Limited, Leaside, Ontario, Canada, a corporation of Canada Application January 29, 1944, Serial No. 520,163

13 Claims. (Cl. 93—18)

This invention relates to a method and apparatus for making bags and is particularly directed to the high speed manufacture of bags from a continuous web of thermoplastic or thermoplastic coated material.

Methods and apparatus for the manufacture of bags from a continuous web of thermoplastic or thermoplastic coated material having adhesive properties under the influence of heat and pressure are relatively well known in the art. In general, the methods and apparatus of the prior art involve the steps of advancing a strip of thermoplastic or thermoplastic coated material of indefinite length through a machine to form the material, in a sequence of mechanical operations, into bag sections from which the individual bags are cut.

In the manufacture of bags from thermoplastic or thermoplastic coated material, the strip is formed into bag sections by the application of heat. Under the sealing conditions, the strip tends to adhere to the sealer with the result that high speed production has not been possible. In order to overcome the tendency of the material to adhere to the sealer, it has been necessary to operate the machine at slow speeds or, alternatively, stop the movement of material through the machine during the interval the sealer is in contact with the material, or to seal and cut in separate operations.

A further problem in such machines is that they are set up to produce a particular size bag and a change in the bag size cannot be made without extensive changes in various parts of the machine.

A still further problem in the operation of bag making machines is that encountered in the manufacture of heat sealed bags from a strip of printed material which necessitates proper positioning of the strip in forming the bag sections and in cutting them from the strip. Where these operations are conducted in two separate stages, a localizing device, such as an electric eye, can be provided for positioning the strip. However, it is found that while the strip may be positioned correctly for forming the bag sections, it has been impossible to coordinate the spacing of the printing on the strip with both the sealing and cutting operations when separate units are used.

One of the primary features of the present invention resides in the novel arrangement of parts which provides a bag making machine capable of operating continuously at a very high speed to produce bags formed of thermoplastic or thermoplastic coated material of uniform quality.

This feature involves, in general, making bags from a continuous strip of heat sealable material dividable into bag sections and includes the steps of simultaneously transversely heat sealing and partially severing a bag section in a single continuous operation, advancing the strip of partially severed bag sections from the heat sealing and partial severing operation, and completing the separation of the bag sections by engaging the leading, partially severed bag section and advancing it at a rate faster than that at which the strip is advanced through the sealing and cutting operation, and holding the next following bag section during the interval the leading bag section is being separated from the strip.

A further feature of the invention resides in the novel arrangement of parts whereby the size of the bags produced by the machine can be varied within relatively wide limits by easily and quickly executed adjustments in the speed of the feeding and conveying mechanisms.

This feature is attained by advancing the strip of material to the sealing and cutting operation at a faster speed than that at which the sealing and cutting operation is conducted, and conveying the partially separated bag sections from the sealing and cutting operation at a speed approximately equal to that at which the strip is advanced to the sealing and cutting operation.

A still further feature of the invention resides in the provision of a preheating arrangement to heat the strip of material to a temperature approaching but below that at which it would tend to become adhesive, whereby the actual step of sealing the strip to form the bag sections is conducted with a minimum differential between the temperature of the strip and its sealing temperature to permit the high speed production of bags coated with a substance having a relatively high melting temperature.

An understanding of the manner in which the above and other features of the present invention are attained may be had from the following description, reference being made to the accompanying drawings, in which:

Figure 1 is a top plan view of a bag making machine incorporating the improvements of the present invention;

Figure 2 is a side elevation;

Figure 5 is a diagrammatic view of an alternative modification showing two strips of heat sealable material being brought together in overlying relation;

Figure 6 is a schematic view of an arrangement for adjusting the position of the separating and holding elements relative to the position of a bag section on the conveyor;

Figure 7 is a top plan view of the arrangement illustrated in Figure 6;

Figure 8 is an enlarged end elevation of the sealing and cutting roll;

Figure 9 is a top plan view of the strip showing the effect of the various operation on the strip;

Figure 10 is a detail view of the feed rolls and sealing and cutting unit, showing the buckling effect on the strip during the interval the sealing and cutting unit is in contact with the strip when the feed rolls are driven at a rate of speed faster than that of the sealing and cutting unit;

Figure 11 is a diagrammatic top plan view of an arrangement for sealing the bottom of the strip;

Figure 12 is a side elevation of the modification illustrated in Figure 11; and

Figure 13 is a side elevation, slightly in perspective of a bag formed with the side and bottom seals.

Like reference characters refer to like parts throughout the specification and drawings.

Figure 3:
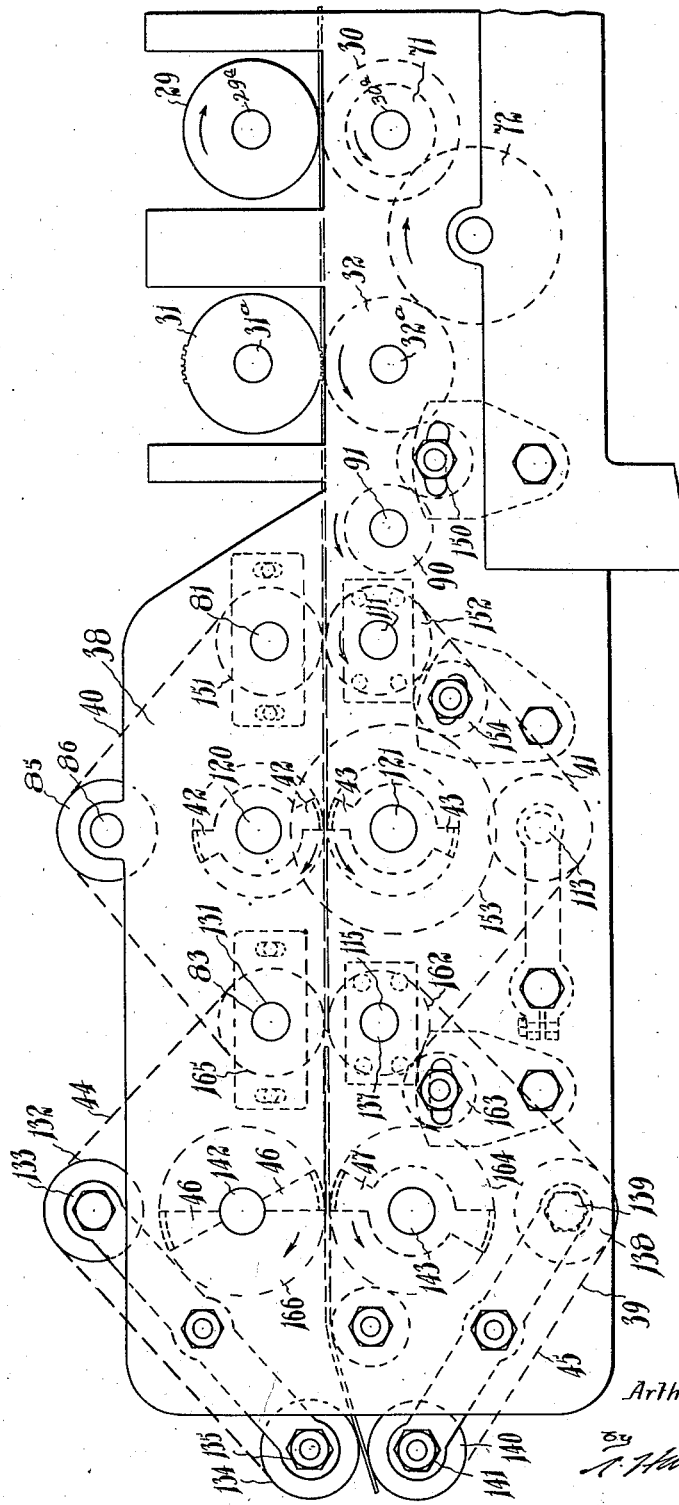
Figure 3 is a side elevation showing the driving connections.

A preferred embodiment of a bag making machine incorporating the improvements of the present invention comprises, in general, a former for folding the web of material longitudinally; feed rolls for advancing the strip from the source of supply through the former to a rotary sealing and cutting unit adapted to divide the strip into bag sections and to partially separate the bag sections from the strip; a conveyor for receiving the strip passed through the sealing and cutting unit and for discharging the bags from the machine; separating means for engaging and snatching the leading bag section and holding means for holding the next following bag section during the interval the leading bag section is engaged by the separating means.

The machine incorporating these improvements comprises a frame 10 formed of horizontal and vertical members and having a top 11. A shaft 12 is journalled in bearings mounted in the rearward extension 13 of the frame. A roll of thermoplastic or thermoplastic coated bag material is carried on the shaft 12. A brake 15 is provided on the shaft 12 to exert a slight resistance to its rotation and thereby exert a slight tension on the web of material to ensure a uniform rate of feed from the roll. The brake 15 is of any suitable standard design.

Transversely disposed, freely rotatable guide rolls 16 and 17 are journalled in bearings mounted in a frame 18 at the rear of the machine above the rearward extension 13.

A transverse bar 19 is journalled in the frame 18 above the upper guide roll 17, to which are secured the spaced apart ends of the triangular shaped former 20. The arms of the former converge to terminate in a triangular shaped, horizontally disposed former plate which is supported, at its forward end, by a vertical rod 21 which, in turn, is carried by a member 22 extending forwardly from the frame 18.

A series of guide rolls 23 and 26 and bars 24 and 25 are joined to and extend vertically upwardly from the top 11. A triangular shaped plate 27 extends vertically upwardly from the top, extending angularly forwardly from a point slightly in the rear of the guide roll 26 to pass in front of that guide roll and to terminate approximate to a horizontally disposed guide roll 28.

The upper and lower feed rolls 29 and 30 respectively are located about midway of the length of the machine. These rolls are preferably covered with or formed of a material, such as rubber, which will grip the web of material and draw it from the roll 14, through the former and guide rolls without appreciable slippage. The surfaces of the rolls 29 and 30 are in contact during their rotation to grip the material firmly as it passes between them. The rolls 29 and 30 are mounted on shafts 29a and 30a respectively, which shafts are journalled in bearings carried in blocks extending upwardly from the sides of the frame. The pressure of the rolls 29 and 30 on the strip passing between them can be adjusted by adjustment of the adjusting screws 100, which bear on the upper bearing blocks.

Figure 4:
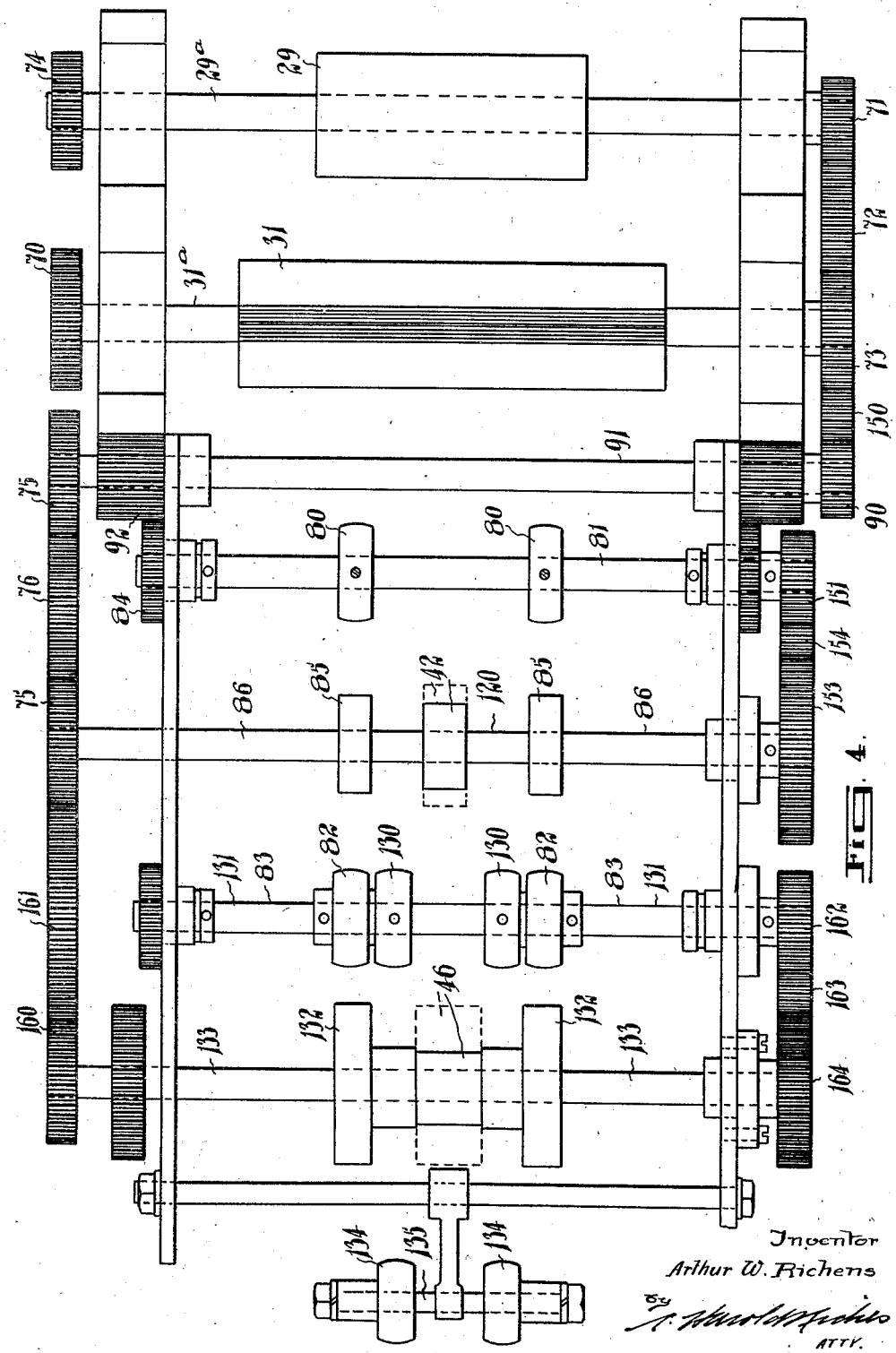
Figure 4 is an enlarged top plan view of the back end of the machine.

The upper and lower sealing and cutting rolls 31 and 32, comprising the rotary sealing and cutting or perforating unit, are mounted on shafts 31a and 32a located immediately in front of the feed rolls to receive the strip of material advanced to them by the feed rolls. The upper roll 31 is designed, as illustrated in Figures 1, 4 and 8, to include at least one sealing and cutting unit comprising a knife and one or more narrow, spaced apart ridges or sealing bars 33 on each side of the knife and parallel thereto. The knife and sealing bars are raised slightly above the surface and extend across the length of the roll 31, the edge of the knife being raised slightly above the level of the sealing bars. The knife and sealing bars are preferably raised sufficiently above the surface of the roll that when out of contact with the strip there is sufficient clearance to permit the strip to pass between the surfaces of the rolls without interference. As the rolls are heated, this spacing apart of the surfaces of the rolls prevents contact with the strip of material except along the areas to be sealed. Dependent upon the diameter of the roll 31 and the width of the bag to be formed, the roll may be designed to include only one sealing and cutting unit, or may be designed to include more than one such unit.

The knife 34 is characterized in that the edge is formed with several small nicks or breaks 35 in its surface spaced across its length. In passing between the sealing and cutting rolls, the strip is severed, between the heat sealed areas, along the transverse line contacted by the knife edge. The portions of the strip not contacted by the knife edge, due to the nicks 35 in the edge, remain uncut and the bag section remains partially attached to the strip. The knife edge may be designed to perforate the strip or to merely leave several uncut areas, sufficient that the bag section remains attached to the strip but easily separated in a later stage.

The lower roll 32 is a cylindrical roll and provides a cutting surface for the knife edge 34. If desired, of course, the position of the rolls 31 and 32 can be reversed, but for accessibility it is preferred to have the roll containing the sealing and cutting unit or units uppermost.

An arrangement for preventing the leading partially separated bag section from adhering to and becoming wound around the sealing and cutting unit is illustrated in Figures 1, 2, 3, 4, 6 and 7 and comprises a conveyor 38 which receives the partially separated bag sections as they emerge from the sealing and cutting unit and advances them to a second conveyor system 39 on which each leading bag section, in sequence, is separated from the next following bag section and discharged from the machine. Alternatively, the strip of partially severed bag sections may be conveyed from the sealing and cutting rolls and the individual bags discharged from the machine by means of a single conveyor system.

The conveyor system 38 comprises the upper and lower endless rotating tapes 40 and 41. The upper tapes 40, preferably two or more in number, are spaced apart slightly and are extended over the pulleys 80, keyed to the driven shaft 81 which extends transversely of the frame at the rearward end of the conveyor, over the pulleys 85 keyed to the shaft 86 which extends transversely of the frame about midway of the length of the conveyor and above the level of the shaft 81, and over the pulleys 82 mounted on the shaft 83 which extends transversely of the frame at the front of the conveyor.

The lower tapes 41 are parallel to the tapes 40 and extend over the pulleys 110, 112 and 114 which are mounted respectively on shafts 111, 113 and 115 which extend transversely of the frame below shafts 81, 86 and 83 respectively.

The opposing tapes 40 and 41 are spaced slightly apart so that they only lightly engage the bag sections fed therebetween. The movement of the bag sections is a conveying movement as the tapes exert only a slight friction pull on partially separated bag sections sufficient to keep the strip taut but insufficient to cause any separation of the bag sections.

The upper and lower holding segments 42 and 43 are mounted on shafts 120—121 which extend transversely of the frame, preferably in a position between the shafts 86 and 113. The segments are preferably in the form of corrugated rubber blocks, the surfaces of which contact each other for a predetermined interval during each revolution of the shafts 120—121.

The conveyor system 39 is of similar design to that described hereinabove: the upper tapes extend over pulleys 130 which are keyed to the transverse shaft 131, over the pulleys 132 which are mounted on the shaft 133, and over pulleys 134 which are keyed to the shaft 135. The lower tapes 45 are extended over the driving pulleys 136 which are keyed to the shaft 137, over pulleys 138 which are mounted on the shaft 139, and over the pulleys 140 which are keyed to the shaft 141.

The upper and lower separating segments 46 and 47 are mounted on shafts 142 and 143 respectively which extend transversely of the frame preferably between the shafts 133 and 139. Like the holding segments, the separating segments are preferably in the form of corrugated rubber blocks, the opposing surfaces of which contact each other during each revolution of the shafts 142 and 143.

The feed rolls, the rotary sealing and cutting rolls, the conveyors, the holding segments and the separating segments are driven from an electric motor 60 connected to the drive shaft 61 through the belt 62 and pulley 63. For convenience, the drive shaft 61 is an extension of the shaft 32a on which the lower sealing and cutting roll is mounted.

The upper heat sealing and cutting roll 31 is driven by the gear 70 which is keyed to an extension of the shaft 31a, which gear is meshed with a gear (not shown) keyed to the drive shaft 61. The gear ratio of these gears is 1:1 so that both shafts 31a and 32a are driven at the same speed.

The shaft 30a, upon which the lower feed roll is mounted, is driven through the gear 71, which is keyed to an extension of the shaft 30a through an adjustable idler gear 72 which, in turn, is meshed with a gear 73 which is keyed to an extension of the shaft 32a. The shaft 29a, upon which the upper feed roll is mounted, is driven through the gear 74 which is keyed to an extension of the shaft 29a and meshed with a gear (not shown) which is keyed to an extension of the shaft 30a at the end remote from the gear 71. The ratio of these driving and driven gears is 1:1 whereby the upper and lower feed rolls are driven at the same speed. The speed of the feed rolls may be increased readily by changing the gear sizes, as shown in Figure 7, and adjusting the idler gear 72 to establish a driving connection between the gears 73 and 71. In this way, the speed of the feed rolls is increased without any change in the speed of the sealing and cutting rolls.

The upper tapes of the conveyor 38 are driven through a train of gears comprising a gear 90 keyed to one end of the shaft 91 and meshed with an adjustable idler gear 150 which, in turn, is meshed with the gear 73 on shaft 32a. A gear 92 is keyed to the other end of shaft 91 and is meshed with a gear 84 keyed to shaft 81. The pulleys 82 and 85 are preferably freely rotatable on their respective shafts. The lower tapes of the conveyor are driven through a gear 152 which is keyed to the shaft 111 and meshed with a gear 151 keyed to the shaft 81.

The lower holding roll carrying the holding segments 43 is driven by a gear 153 keyed to the shaft 121 which is meshed with the adjustable idler gear 154 which, in turn, is meshed with the gear 152. The upper holding roll on which the holding segments 42 are mounted is driven by a gear 75 which is keyed to the shaft 120 and meshed with a gear (not shown) keyed to the shaft 121.

The lower tapes of the conveyor 39 are driven through a train of gears comprising a gear 160 keyed to shaft 143 on which the lower separating roll carrying the separating segments 47 is mounted. The gear 160 is meshed with an adjustable idler gear 161 which, in turn, is meshed with the gear 75. The shaft 137, to which the driving pulleys 136 are keyed, is driven by the gear 162 which is keyed to shaft 137 and which is meshed with an adjustable idler gear 163 which, in turn, is meshed with a gear 164 keyed to the shaft 143. The upper tapes 44 are driven by the gear 165 which is keyed to the shaft 131 and meshed with the gear 162. The upper separating roll on which the upper separating segments 46 are mounted is driven by a gear 166 which is keyed to shaft 142 and meshed with gear 164. The pulleys 132, 134, 138 and 140 are preferably freely rotatable on their respective shafts.

A manual arrangement is also provided for driving the various parts of the machine for use in advancing the material through the machine. This arrangement includes a handwheel 81 keyed to a sliding shaft 82 extending transversely of the frame and located at a position convenient to the operator. A worm or gear 83 is mounted on the shaft and may be meshed with one of the driving gears of the machine when the machine is stopped. By engaging the gear 83, the mechanism can be driven manually by rotating the handwheel.

In the operation of the machine, the roll of thermoplastic or thermoplastic coated material is mounted on the shaft 12, the end of the strip is threaded behind the roll 16, over the roll 17 and under the former 20 which folds the strip longitudinally along a line which may be coincident with or spaced apart from the longitudinal axis of the strip, depending upon whether the resulting bag is to be formed without or with a closing lip.

From the former 20, the strip is passed in a tortuous path in front of and behind the vertical guide rolls and bars, between the vertical guide roll 26 and the side of the triangular plate 27, thence over the sloping edge of the plate 27 which converts the vertical movement of the strip to the horizontal. It is preferred to provide the upper edge of the triangular plate 27 with a bearing surface to decrease the resistance to the movement of the strip at that point.

The strip is passed under the horizontal guide roll 28, over the guide roll 95, and between the feed rolls 29 and 30. In the normal operation of the machine, these rolls engage the strip firmly and draw it from the roll 14 and advance it between the sealing and cutting rolls 31 and 32.

The upper sealing and cutting roll is provided with at least one of the heat sealing and cutting units described in detail hereinbefore. If only one unit is provided, the strip is transversely heat sealed, preferably along several areas on each revolution of the roll.

On leaving the sealing and cutting rolls, the bag sections, still partially attached to the strip, are received on the conveyor 38 and advanced to the conveyor 39. The conveyor 38 is driven at a faster rate of speed than the speed of the feed rolls. As the opposing tapes are spaced apart there is only a slight friction pulling effect and, consequently, there is no danger of the bag sections being separated from the strip between this conveyor and the sealing and cutting unit. The bag sections are passed to conveyor 39 which is driven at the same speed as that of the preceding conveyor. As the leading bag section is received on conveyor 39 it is engaged by the separating segments 46 and 47 which, in effect, snatch the bag section and cause it to separate from the next following bag section along the partially cut or perforated line of demarcation between them. At the same time that the leading bag section is engaged by the separating members 46 and 47, the next following bag section is engaged by the holding segments 42 and 43 which hold it firmly to prevent the pulling effect from being transmitted further along the strip. The separating and holding segments are preferably positioned such that the separating segments engage the leading bag section approximate to the rear sealed and partially severed lines while the holding segments engage the next following bag section approximate to its forward sealed and partially severed lines. The separating and holding segments are preferably adjustable to maintain the same relative position regardless of the length of material between the sealed and partially severed lines.

The individual bags, after being separated in the manner described, are discharged from the machine by the conveyor 39.

In the normal operation of the machine, the sealing and cutting unit is driven at a substantially constant speed at which the most satisfactory sealing result is obtained. The speed of the feed rolls, conveyor systems, and separating segments can be increased readily by substituting driving gears of different diameter and adjusting the position of the idler gears to bring them into mesh with their respective driving and driven gears.

Assuming that the feed rolls are driven at the same speed as the sealing and cutting unit, the conveyor 38 is driven somewhat faster than the feed rolls to carry away the excess material which accumulates between the feed rolls and the sealing unit during the interval the sealing unit is in contact with the strip. For example, very satisfactory results are obtained if the conveyor 38 is driven at a speed from 20% to 100% faster than the feed rolls, dependent upon the distance between seals. Also, the holding segments are driven at a speed slightly less than that of the sealing and cutting rolls. The conveyor 39 is driven at approximately the same speed as that of the separating segments 46 and 47, which speed is substantially faster than the speed of the sealing and cutting rolls.

The holding segments and the separating segments are spaced such that while the separating segments engage the leading bag section, the next following bag section is held firmly by the holding segments. An arrangement for adjusting the position of the snatching and holding elements relative to the position of a bag section on the conveyor is schematically illustrated in Figures 6 and 7 in which the shafts on which the snatching and holding elements are mounted are carried by a frame 180. The frame 180 comprising two spaced apart plates may be mounted at the front end of the frame 10 in such a manner as to be movable towards or away from the sealing and partial cutting unit, so that the snatching and holding elements may be positioned such that they straddle the seal and partially severed lines separating the leading bag section from the next following bag section. In this latter modification only a single conveyor system would be necessary.

In the modification of the invention illustrated in Figure 8, the feed rolls are driven at a faster rate of speed than that of the sealing and cutting unit whereby the strip of material between the feed rolls and the sealing and cutting unit is caused to buckle during the interval the sealing and cutting unit is in contact with the material. When the sealing and cutting unit is out of contact with the material the strip is conveyed forwardly between the slightly spaced apart surfaces of the rolls 31 and 32, thereby maintaining the rate of movement of the strip the same as that provided by the feed rolls to maintain uniformity in the spacing of the sealing and cutting operation. In this embodiment, the relative speed of the conveyors 38 and 39 and associated parts to that of the feed rolls remains the same, that is, the conveyor is driven at a speed, preferably from about 25% to 100% faster than that of the feed rolls, whereby the partially separated bag sections emerging from the sealing and cutting unit are conveyed away from that unit at the same rate as that at which it is passed through the sealing and cutting rolls.

In order to accommodate the greater distance between the seals of the bags formed in this embodiment, the separating and holding elements may be moved to a position such that they straddle the heat sealed and partially severed lines between the leading and next following bag sections.

As a further modification of the invention, it is found that the provision of an arrangement for preheating the strip of material to a temperature above its normal temperature but below that at which the material would tend to become adhesive enables certain types of material to be fed through the sealing and cutting roll at a much greater speed than would be possible otherwise. For example, should a coating become adhesive at 350° F., it could be safely preheated to a temperature below that at which it becomes adhesive, such as at about 300° F., which decreases the differential between the temperature of the strip and its sealing temperature and makes possible effective sealing on rotation of the sealing and cutting unit at speeds which otherwise would be impossible to realize. The incorporation of such a preheating arrangement is exemplified in Figure 2 by the provision of a freely rotatable, heated cylinder 93, which is mounted on the transverse shaft 94, over which the strip is passed before it is passed to the sealing and cutting unit. The cylinder 93 is heated, such as electrically or by steam, to a temperature such that the strip passing over it is heated to a desired temperature below that at which it would tend to become adhesive, at approximately which temperature it is passed to the sealing and cutting rolls. As a result of this preheating arrangement, it is only necessary for the sealing unit to be in contact with the strip long enough to heat the areas from say 300° F. to 350° F. instead of from about 70° F. to 350° F. which would otherwise be necessary. The provision of this preheating arrangement is particularly effective for the high speed production of bags from heat sealable material which becomes plastic only at relatively high temperatures.

As an alternative preheating arrangement, the strip of material may be passed through a heating chamber, which, in combination with the preheating roll 93, quickly preheats the material to the desired temperature.

A further arrangement is provided for sealing the bottom of each bag section if such a seal is deemed advantageous in the design of the bag. This sealing arrangement is illustrated in Figure 12 wherein the strip is passed between sealing rolls 95 and 96, each roll being provided with a heated sealing section 95a and 96a between which the strip is passed and which bear against the bottom of the strip. The rolls 95 and 96 are preferably adjustable to bring the desired degree of pressure to bear on the strip.

The improvements constituting the present invention are also applicable to the manufacture of bags formed by bringing two strips of heat sealable material together in overlying relationship as illustrated in Figure 10. In this modification, two strips of material 170 and 171 are drawn from their respective feed rolls 172 and 173 passed through sealers 174 which seal the longitudinal edges of the strips to form a sealed tube-like strip dividable into bag sections. This strip is advanced through feed rolls and sealing and cutting unit in the manner described hereinabove with the exception that one set of sealing bars is eliminated to form an open end type bag. No former or folding arrangement is necessary in this modification.

It is found by the incorporation of the improvements of the present invention in machines for making bags of thermoplastic or thermoplastic coated materials, that bags of a uniform quality are produced at a rate of production heretofore considered impossible to realize.

The manner in which the individual bags are separated from the strip is of primary importance in the high speed production. It is found that if the bags are completely severed in the cutting operation, they tend to adhere to the sealing roll which disrupts the operation of the machine. By only partially cutting the bag sections and passing the bags as a strip of partially separated bag sections from the sealing and cutting operation to be completely separated away from the sealing and cutting unit, this difficulty is avoided and the high speed operation of the machine is made possible.

It is found also, that while the depth of the bag is only limited by the length of the various operating rolls and can be varied by changing the width of the strip of material advanced through the machine within the limits of the rolls, the distance between the seals in the bags can be increased readily by increasing the relative speeds of the feed rolls, conveyor systems and associated parts while maintaining the speed of the heating and cutting rolls and holding elements constant. As a result, the machine is readily adjusted to make different sizes of bags without any appreciable delays. This also is made possible by advancing the bags from the sealing and cutting unit as a strip of partially separated bag sections which are engaged by the conveyor and drawn from the sealing and cutting unit as fast as the strip of material is passed through that unit.

A machine incorporating the improvements of the present invention is capable of producing bags at a very high rate of production limited only by the sealing properties of the material. As a specific embodiment, assuming a production rate of 30,000 bags per hour with a two stage sealing and cutting unit, the sealing and cutting rolls are driven at a speed of 250 R. P. M., the feed rolls may be driven at the same rate of speed, or faster if it is desired to increase the distance between the seals and the conveyor system is driven at a speed of from 20% to 100% faster than the feed rolls. The holding segments are driven at a slightly slower speed than the sealer to avoid any pulling effect on the strip of partially severed bag sections between those elements and the sealer and the separating or snatching elements are driven appreciably faster than the holding elements to ensure a snatching effect on the leading bag section.

It will be understood, of course, that modifications of the preferred embodiment of the invention described and illustrated herein, may be made by others skilled in the art in the light of the teachings herein without departing from the scope of the invention as defined by the appended claims.

What I claim as new and desire to protect by Letters Patent of the United States is:

1. A method for making bags from a continuous strip of heat sealable material which comprises folding the strip longitudinally, advancing the folded strip from the folding step to a sealing and cutting operation at a speed faster than the speed of the sealing and cutting operation, transversely heat sealing the strip to divide it into bag sections and simultaneously partially separating the bag sections in the cutting operation, advancing the partially separated bag sections at a speed not greater than that at which the strip is advanced to the sealing and cutting operation, separating the leading bag section from the strip of bag sections by engaging it and advancing it at a faster rate than that at which the strip is advanced to the sealing and cutting operation, and holding the next following bag section during the interval the leading bag section is being separated from the strip.

2. A machine for making bags from a strip of heat sealable material which comprises, in combination, a former for folding the strip longitudinally, feed rolls for advancing the material through the machine, combined rotary sealing and cutting means transversely disposed in relation to the movement of the folded strip for transversely heat sealing and partially cutting the strip at predetermined intervals to form bag sections partially attached to the strip, means for advancing the strip of partially severed bag sections from the sealing and cutting means at a speed not greater than that at which the strip is advanced to the sealing and cutting means, and separating means rotatable at a faster speed than said sealing and cutting roll for engaging the leading, partially severed bag section and for advancing it at a faster rate than the rate at which the strip is advanced through the rotary sealing and cutting means, and means for holding the next following bag section during the interval the leading bag section is engaged by said separating means.

3. A machine for making bags from a strip of heat sealable material which comprises, in combination, a former for folding the strip longitudinally, a heated cylinder for preheating the strip, feed rolls for advancing the strip of material through the machine, combined rotary sealing and cutting means transversely disposed in relation to the movement of the folded strip for transversely heat sealing and partially cutting the strip at predetermined intervals to form bag sections partially attached to the strip, and separating means rotatable at a faster speed than said sealing and cutting roll for engaging the leading partially severed bag section and for advancing it at a faster rate than the rate at which the strip is advanced through the rotary sealing and cutting means, and means for holding the next following bag section during the interval the leading bag section is engaged by said separating means.

4. A machine for making bags from a strip of heat sealable material dividable into bag sections, which comprises means for advancing the strip through the machine to rotary sealing and cutting means transversely disposed with relation to the movement of the strip for sealing and partially cutting the strip transversely at predetermined intervals to form bag sections partially attached to the strip, the rate of movement of said strip to said rotary sealing and cutting means being faster than the speed of said rotary sealing and cutting means, and means for engaging the strip leaving the rotary sealing and cutting means and for advancing it at a speed not greater than the speed at which the strip is advanced to the rotary sealing and cutting means, and means for engaging the leading bag section and for advancing it at a speed greater than that of the strip of partially severed bag sections, and means for holding the next following bag section during the interval the leading bag section is engaged and advanced at the faster speed.

5. In combination with a machine for making bags from a continuous strip of heat sealable material dividable into bag sections, means for feeding the strip to rotary heat sealing and cutting means simultaneously adapted to form the strip into bag sections and to partially separate each bag section from the strip, conveyor means adapted to advance the partially separated strip of bag sections at a speed not greater than the speed at which the strip is advanced through said rotary sealing and cutting means, means for gripping the leading partially separated bag section and for advancing it at a speed greater than the speed of said strip, and means for holding the next following bag section during the interval said engaging means are in engagement with the leading bag section.

6. In a machine for making bags from a continuous strip of heat sealable material, the combination of driven feed rolls, a combined rotary heat sealing and cutting unit for forming and partially severing a bag section in a continuous strip of heat sealable material, a conveyor movable at a speed at least as fast as that of the strip of bag sections emerging from the rotary sealing and cutting unit, gripping means for engaging the leading incompletely separated bag section and for bursting it from the next following bag section, and holding means synchronized with said gripping means for engaging the following bag section during the interval the leading bag section is engaged by the first mentioned gripping means.

7. In a machine for making bags from a continuous strip of heat sealable material, the combination of driven feed rolls, a rotary heat sealing and cutting unit for forming and partially severing bag sections, a conveyor movable at a speed at least as fast as that of the strip emerging from the rotary sealing and cutting unit, gripping means adapted to engage the leading bag section and to snatch it from the next following bag section, and holding means synchronized with said gripping means adapted to engage and hold the next following bag section during the interval the leading bag section is engaged by the first mentioned gripping means, said gripping and holding means being positioned to straddle the heat sealed and partially severed lines between the leading and next following bag sections.

8. In a machine for making bags from a strip of heat sealable material dividable into bag sections, the combination of a heat sealing and cutting unit adapted to form bag sections partially attached to said strip of heat sealable material and transversely disposed with relation to the movement of the strip of material fed thereto, conveyor means adapted to advance the strip of partially severed bag sections from the heat sealing and cutting unit, conveyor means for advancing the strip of partially severed bag sections to snatching means adapted to engage the leading partially attached bag section discharged from the sealing unit and burst it from the next following bag section, and gripping means adapted to engage and hold the next following bag section during the interval the leading bag section is engaged by said snatching means.

9. A method for making bags from a continuous strip of heat sealable material dividable into bag sections which comprises the steps of preheating the strip to a temperature below the adhesive temperature of the material, simultaneously transversely heat sealing and partially severing a bag section in a single continuous operation, advancing the strip of partially severed bag sections from the heat sealing and partial severing operation, and completing the separation of the bag sections by engaging the leading partially severed bag section and advancing it at a rate faster than that at which the strip is advanced through the sealing and cutting operation, and holding the next following bag section during the interval the leading bag section is being separated from the strip.

10. In a machine for making bags from a continuous strip of heat sealable material dividable into bag sections, means for simultaneously transversely heat sealing and partially severing a bag section from the strip, means for advancing the strip of bag sections as a continuous strip from the sealing and partial cutting means, means for engaging the leading incompletely separated bag section and for advancing it at a rate faster than the rate of advancement of the strip through the sealing and partial separating means, and means for engaging the next following bag section during the interval the leading bag section is engaged and advanced.

11. In a machine for making bags from a continuous strip of heat sealable material dividable into bag sections, means for forming a strip of double thickness, means for preheating the strip to a temperature below the temperature at which the material tends to become adhesive, means for simultaneously transversely heat sealing and partially severing a bag section from the strip, means for advancing the strip of partially severed bag sections from the sealing and partial severing means, means for engaging the leading, incompletely separated bag section and for advancing it at a rate faster than the rate of advancement of the strip through the sealing and partial separating means, and means for holding the next following bag section during the interval the leading bag section is engaged by said engaging means.

12. A machine for making bags from a continuous strip of heat sealable material which comprises means for folding the strip longitudinally, means for advancing the strip from a source of supply through said folding means to means for simultaneously transversely heat sealing the folded strip to form bag sections and for partially separating the bag sections from the folded strip whereby a bag section is formed at the end of and partially attached to the strip, means for advancing the strip of partially separated bag sections as a continuous strip to means for engaging the leading bag section and for advancing it at a faster rate than that at which the strip is advanced through the sealing and partial separating means, and means for holding the next following bag section during the interval the leading bag section is engaged by said engaging means.

13. A machine for making bags from a strip of heat sealable material which comprises means for folding the strip longitudinally, means for advancing the strip from the source of supply to rotary sealing and cutting means transversely disposed in relation to the movement of the strip, said sealing and cutting means being adapted for high speed rotation and effective for transversely heat sealing and partially cutting said strip at predetermined intervals whereby a bag section is formed and partially separated from the strip passing through said sealing and cutting means, means for advancing the strip of partially separated bag sections as a continuous strip to means for engaging the leading bag section and advancing it at a faster rate than that at which the strip is being advanced through the sealing and partial cutting means, and means for holding the next following bag section during the interval the leading bag section is engaged by said engaging means.

ARTHUR W. RICHENS.

REFERENCES CITED

The following references are of record in the file of this patent:

UNITED STATES PATENTS

| Number | Name | Date |
|---|---|---|
| 2,126,908 | Moore | Aug. 16, 1938 |
| 2,147,757 | Schneider | Feb. 21, 1939 |
| 2,157,054 | Gammeter | May 2, 1939 |
| 2,191,497 | Potdevin | Feb. 27, 1940 |
| 2,248,471 | Stroop | July 8, 1941 |
| 2,265,075 | Knuetter | Dec. 2, 1941 |
| 2,301,771 | Billeb | Nov. 10, 1942 |
| 2,344,720 | O'Connell | Mar. 21, 1944 |
| 2,347,439 | Shea et al. | Apr. 25, 1944 |